United States Patent
Esquius et al.

(10) Patent No.: US 11,292,195 B2
(45) Date of Patent: Apr. 5, 2022

(54) OPERATIONAL CHARACTERISTICS OF SCREENS IN THERMAL IMAGING

(71) Applicant: HEWLETT-PACKARD DEVELOPMENT COMPANY, L.P., Houston, TX (US)

(72) Inventors: Ferran Esquius, Sant Cugat del Valles (ES); Juan Manuel Valero Navazo, Sant Cugat del Valles (ES); Ignacio Alejandre, Sant Cugat del Valles (ES); Esteve Comas, Sant Cugat del Valles (ES)

(73) Assignee: Hewlett-Packard Development Company, L.P., Spring, TX (US)

(*) Notice: Subject to any disclaimer, the term of this patent is extended or adjusted under 35 U.S.C. 154(b) by 464 days.

(21) Appl. No.: 16/089,065

(22) PCT Filed: Sep. 28, 2016

(86) PCT No.: PCT/US2016/054139
§ 371 (c)(1),
(2) Date: Sep. 27, 2018

(87) PCT Pub. No.: WO2018/063187
PCT Pub. Date: Apr. 5, 2018

(65) Prior Publication Data
US 2019/0126549 A1    May 2, 2019

(51) Int. Cl.
*B29C 64/295* (2017.01)
*B22F 3/105* (2006.01)
(Continued)

(52) U.S. Cl.
CPC ............ *B29C 64/295* (2017.08); *B22F 10/20* (2021.01); *B29C 64/153* (2017.08);
(Continued)

(58) Field of Classification Search
CPC ... B29C 64/153; B29C 64/205; B29C 64/295; B29C 64/393; B33Y 30/00; B33Y 50/02; B22F 10/20; B22F 10/30
See application file for complete search history.

(56) References Cited

U.S. PATENT DOCUMENTS 6,059,406 A    5/2000  Richtsmeier et al.
6,815,636 B2  11/2004  Chung et al.
(Continued)

FOREIGN PATENT DOCUMENTS

RU    2013123046 A    12/2014

OTHER PUBLICATIONS

Price et al., "Evaluations of Temperature Measurements in Powder-based Electron Beam Additive Manufacturing by Near-Infrared Thermography", Int. J. Rapid Manufacturing, vol. 4, Issue No. 1, Retrieved from Internet: http://www.inderscience.com/storage/f371198101265421.pdf, 2014, 13 pages.

*Primary Examiner* — Robert J Grun
(74) *Attorney, Agent, or Firm* — HP Inc. Patent Department

(57) ABSTRACT

In an example, a method includes acquiring a thermal image of a reflector within an additive manufacturing apparatus through a screen. An energy profile of the thermal image of the reflector may be determined and, based on the energy profile, an operational characteristic of the screen may be determined.

15 Claims, 3 Drawing Sheets

(51) Int. Cl.
   *B29C 64/153*    (2017.01)
   *B29C 64/393*    (2017.01)
   *B33Y 30/00*     (2015.01)
   *B33Y 50/02*     (2015.01)
   *B29C 64/205*    (2017.01)
   *B22F 10/20*     (2021.01)
   *B22F 10/30*     (2021.01)

(52) U.S. Cl.
   CPC .......... *B29C 64/205* (2017.08); *B29C 64/393* (2017.08); *B33Y 30/00* (2014.12); *B33Y 50/02* (2014.12); *B22F 10/30* (2021.01)

(56) References Cited

U.S. PATENT DOCUMENTS

| | | |
|---|---|---|
| 7,718,933 B2 | 5/2010 | Huskamp |
| 9,114,478 B2 | 8/2015 | Scott et al. |
| 2008/0262659 A1 | 10/2008 | Huskamp |
| 2009/0206522 A1 | 8/2009 | Hein et al. |
| 2014/0314613 A1 | 10/2014 | Hopkinson et al. |

OPERATIONAL CHARACTERISTICS OF SCREENS IN THERMAL IMAGING

BACKGROUND

Additive manufacturing techniques may generate three-dimensional objects on a layer-by-layer basis through the solidification of a build material. In examples of such techniques, build material is supplied in a layer-wise manner and a solidification method may include heating the layers of build material to cause melting in selected regions. In other techniques, other solidification methods, such as chemical solidification methods or binding materials, may be used.

BRIEF DESCRIPTION OF DRAWINGS

Non-limiting examples will now be described with reference to the accompanying drawings, in which.

DETAILED DESCRIPTION

Figure 1:
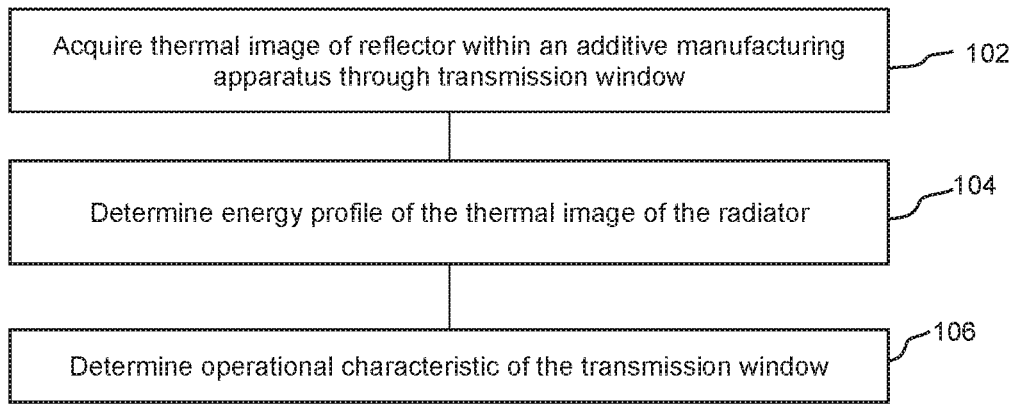
FIG. 1 is a flowchart of an example method of determining an operational characteristic of a screen.

Additive manufacturing techniques may generate three-dimensional objects through the selective solidification of a build material. In some examples, the build material may be a powder-like granular material, which may for example be a plastic, ceramic or metal powder. The properties of generated objects may depend on the type of build material and the type of solidification mechanism used. Build material may be deposited, for example on a print bed and processed layer by layer, for example within a fabrication chamber.

In some examples, selective solidification is achieved through directional application of energy, for example using a laser or electron beam which results in solidification of build material where the directional energy is applied. In other examples, at least one chemical agent, referred to herein as a print agent, may be selectively applied to the build material, and may be liquid when applied.

For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat, light or some other energy) is applied to the layer, for example from an energy radiation source, the build material to which it has been applied coalesces and solidifies to form a slice of the three-dimensional object in accordance with the pattern, whereas build material on which no fusing agent is distributed is not intended to fuse. In other examples, coalescence may be achieved in some other manner.

In addition to a fusing agent, in some examples, a print agent may comprise a coalescence modifying agent, which acts to modify the effects of a fusing agent for example by reducing or increasing coalescence or to assist in producing a particular finish or appearance to an object, and such agents may therefore be termed detailing agents. A coloring agent, for example comprising a dye or colorant, may in some examples be used as, or incorporated in, a fusing agent or a modifying agent, and/or as a print agent to provide a particular color for the object.

In certain additive manufacturing systems, measurement of working area temperatures enables feedback control of build material heating. For example, radiation sources may be controlled to apply energy to layers of build material, in some examples following deposit of printing agents, based on temperature measurements, e.g. a level of radiation may be adjusted or at least one radiation source may be selectively switched on and off. If the temperature of portions of a working area, e.g. where layers of build material are formed and processed, varies from intended operational ranges this can lead to a range of different undesirable effects. These may include, for example, poor cohesion between layers and structurally unsound builds. For example, portions of an upper layer of build material wherein a fusing agent has been applied may need to be heated to above a melting point to cause the build material to melt, coalesce or fuse, and then solidify after cooling. In this case, inaccurate measurement of temperature may lead to incomplete fusion (if the temperature is too low) or may cause unwanted chemical changes (if the temperature is too high). In extreme cases, if unchecked, the temperatures reached could potentially be so high as to cause a safety hazard.

In some examples, there may be an intended range of working area temperatures, and action may be taken to address any departure from that range. For example, build material temperatures may be measured during object manufacture and a feedback loop may be used such that these temperatures are controlled to be within intended ranges. In addition, other temperatures may be determined. For example, these may include the temperature of at least one component of the manufacturing apparatus, for example to determine if these are with normal or safe operational parameters.

Even with careful calibration of temperature sensing apparatus, there are a number of factors that may result in temperature measurement errors, including, amongst others: temperature reading drift due to heating of the additive manufacturing system, (e.g. during use), vapour condensation, dust accumulation or build material accumulation on a lens, filter or other aperture of a thermal imager; damage to a lens, filter or other aperture of a thermal camera due to contact with a build material and/or due to cleaning following contact with a build material; electrical noise affecting read values and/or transmission of those values; and, overheating of a thermal camera and/or its component parts such as a filter or lens.

In some additive manufacturing techniques, the build material is a powder like substance. As surfaces within the apparatus become heated during use, there is a possibility that particles which are deposited on surfaces may reach a fusing temperature, melt and adhere to the surface.

FIG. 1 is an example of a method, which may be a method for use in additive manufacturing, comprising, in block 102, acquiring a thermal image of a reflector within an additive manufacturing apparatus through a screen. The screen may comprise a protective barrier or window which is thermally transmissive, and may be provided to prevent dust, build material, condensation, vapour or the like from reaching thermal imaging apparatus (and in some examples heating apparatus). In some examples, acquiring a thermal image may comprise acquiring a plurality of temperatures in a fabrication chamber of an additional manufacturing apparatus. For example, a thermal image which comprises at least a region of a print bed within a fabrication chamber may be acquired. If this image is acquired during an additive manufacturing process, it may comprises an image which extends over at least part of surface of a layer of build material. The image may comprise a plurality of pixels, and each of a plurality of the pixels may be associated with a temperature measurement. In one example, the pixels may be in the order of 1-2 cm in length, dividing a measurement field of around 30 cm by 40 cm into around a 32×32 matrix of pixels, although larger or smaller pixels could be formed. The energy contributing to the thermal image may be measured using any type of radiation sensor(s). In some examples the energy may be measured using a thermal imaging camera, or an Infra-red (IR) camera. The screen may comprise any thermally transmissive material. The thermal image may be acquired in any energy band which may be related to or indicative of thermal energy.

The thermal image of the reflector may comprise just part of an acquired thermal image. In such examples, the method may comprise identifying a portion of the image corresponding to the image of the reflector. This may for example comprise use of image processing techniques such as edge detection and/or object recognition, and/or an indication of the location of the reflector within the acquired thermal image, for example based on location measuring apparatus such as an encoder or the like which may be used to directly determine the location of the reflector.

In some examples, the reflector comprises a material having substantially consistent reflection properties (which may be thermal reflection properties) over the surface. Where the reflector also absorbs energy (or absorbs at least a significant amount of energy), the reflector may also comprise high thermal conduction properties. However, in some examples, the reflector may be chosen such that the thermal absorption and emissivity is low compared to the anticipated reflectance levels. In this way, it can be assumed that a surface of the reflector will emit energy (i.e. reflect, and in some cases, irradiate, energy) in a manner which may be assumed to be at least substantially constant over its surface. This means that variations in energy which are detected in the thermal image are less likely to be representative of true variations in the reflected energy/temperature of the reflector, and may therefore be attributed to other sources, as further set out below.

For example, the reflector may comprise a metal material. In some examples, the reflector may comprise a coating, backing or some other surface material. In some examples, the reflector may be a thermal reflector (i.e. will reflect heat).

In some examples, the reflector may have a known, for example empirically determined or modelled, anticipated reflected/irradiated energy profile such that any departure from this profile may be identified as set out below. In some examples, the energy profile may be determined as the reflector is moved relative to a thermal imager.

As further set out below, in some examples, the reflector comprises or forms part of a component of the additive manufacturing apparatus. In a particular example, the reflector comprises a surface of a build material distributor, or recoater, which is moved across the print bed to lay down a layer of build material, which in turn may be caused to selectively fuse and thereby form a layer of the object being generated. Some build material distributors comprise an elongate bar-like structure which extends at least substantially across the width of the print bed and traverses the print bed while dispensing build material. A build material distributor may be effectively scanned through the intended measurement field of thermal imaging apparatus (which in some examples comprises at least the print bed), and a build material distributor having an elongate shape will tend to cover the whole field of measurement in a single pass. However, in other examples, the reflector may comprise at least part of a different component, for example a print head or printing carriage to distribute print agent, an energy source, or some other component which may, in some examples, be a component which is scanned, or moved, through the intended field of measurement of the thermal imaging apparatus. Where the reflector is a thermal reflector, this may assist in maintaining a lower operating temperature of the associated component. In general, however, the reflector may comprise any reflector in such a measurement field, including a reflector introduced for the purpose of carrying out the method.

In some examples, the reflector may be intended to reflect energy from an energy source which may be located close to the thermal imaging apparatus (and may transmit energy via the screen).

In some examples, the method may comprise irradiating the reflector with energy delivered via the screen. In some examples, the method may comprise irradiating the reflector with at least one energy source, for example heat lamp(s). The energy sources may comprise energy sources which are used to cause selective fusion of build material in additive manufacturing processes.

Block 104 comprises determining, using at least one processor, an energy profile of the thermal image of the reflector from energy measurements making up the thermal image. For example, determining an energy profile may comprise determining any, or any combination of: at least one absolute acquired energy measurement, a difference between acquired energy readings corresponding to different locations in the thermal image, determining an energy gradient within the thermal image, and/or identifying the presence of an energy level outside a predetermined threshold in at least one location of the thermal image.

Where the reflector tends to substantially reflect, rather than absorb, energy, the measured energy may be more associated with a reflection of an energy source, for example a heat lamp, than the actual temperature of the reflector.

Block 106 comprises determining, using at least one processor and based on the energy profile, an operational characteristic of the screen. For example, the operational characteristic may be indicative of a thermal absorption characteristic. As noted above, in some examples, build material (or more generally, dust and dirt) may accumulate on the screen. Such material may change (for example, increase) the thermal absorption of the screen in a region local thereto. When a thermal image is captured though such a screen, this will create a 'false' energy level reading of the field of interest: the heat in the material of the screen may create a 'hot spot' on the screen, which may appear as a hot spot in the measurement field. However, by including a reflector in the field of view, region(s) of the screen which bear such deposits may be identified against a background of the reflector, which provides in effect a reference surface. For example, considering a captured image of a reflector with consistent reflectance properties over its surface, it may be anticipated that the image will indicate that the reflector surface is at a single energy level (at least given the detection characteristics of the thermal image, for example the waveband detected). However, if a hot or cold spot is seen in the captured image of this surface, this may be attributable to a deposit on the screen. For example, this may allow the presence of a heat absorbing deposit such as fused plastic build material on the screen to be detected.

Figure 2:
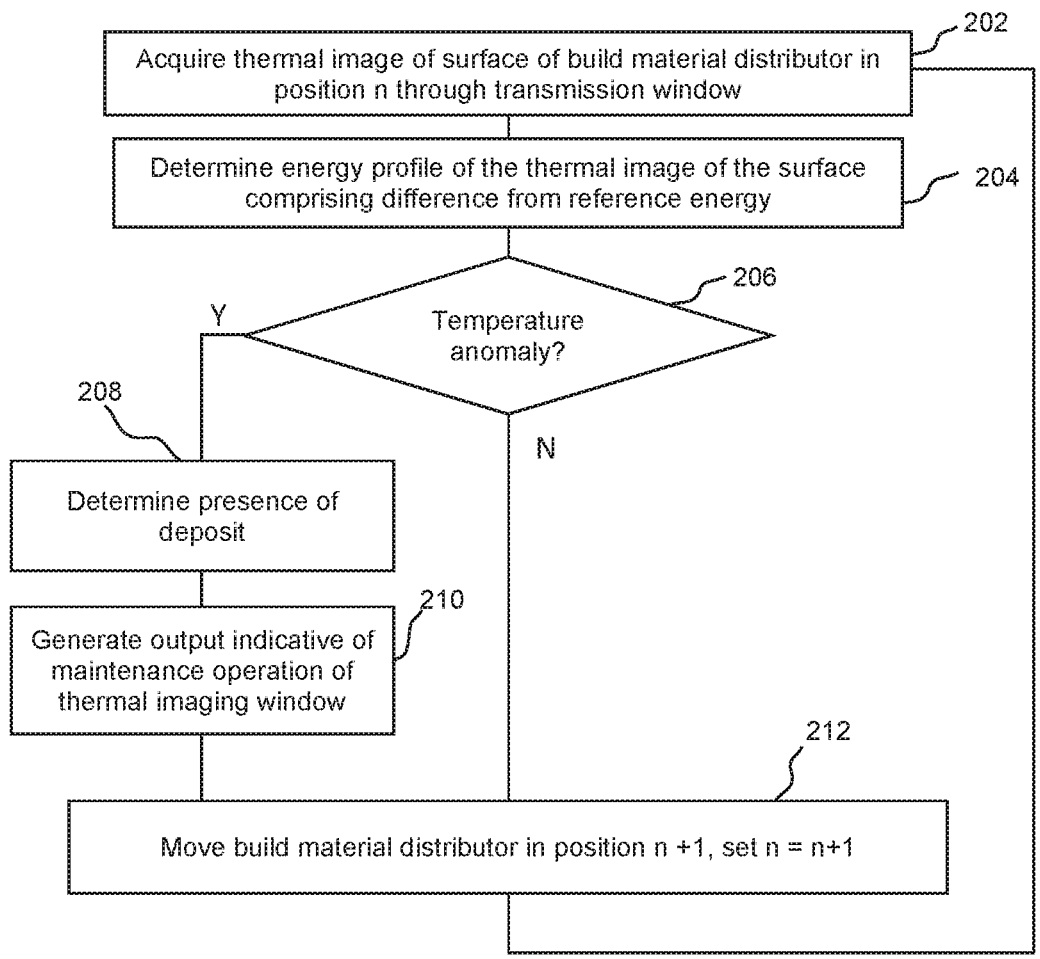
FIG. 2 is a flowchart of another example method of determining an operational characteristic of a screen.

FIG. 2 is another example of a method which may be a method for use in additive manufacturing, comprising, in block 202, acquiring a thermal image of a surface of a build material distributor in a position (position n) within an additive manufacturing apparatus through a screen. In this example, the build material distributor surface comprises a diffuse reflector such as an aluminium alloy (which may comprise a high aluminium content) having a hammered or diffusion coated surface. The diffuse reflector may be such that reflected energy at at least the waveband of interest (e.g. a waveband detected by the imaging apparatus) is reflected substantially evenly in all hemispherical directions (i.e. the reflector is chosen to have some qualities of a 'Lambertian' reflector). Expressed another way, the reflector may be selected such that the luminance thereof is at least substantially isotropic. As a result the average energy which is reflected from any given unit area is likely to be directly comparable to the energy reflected from any other unit area.

Block 204 comprises determining an energy profile of the thermal image of the surface. In this example, the energy profile comprises an indication, for each of a plurality of locations (for example, thermal imaging pixels) in a thermal image, of a difference from a reference energy level. As in this example the surface has a substantially constant (and substantially isotropic) reflectance, it may be assumed that the energy reflected from each point on the surface is actually at least substantially equal. However, in examples where the reflectivity of the reflective surface may vary over the surface, different energy levels may be expected to be returned from different locations on the reflective surface.

In some examples, the reference energy level may be an average energy level (for example, a mean or a modal temperature or reflected energy level) of the thermal image (or the portion of the thermal image corresponding to the reflector, which in this example is the build material distributor). Such a method may be used in examples where the reflector has a consistent reflectance profile (and, if thermally absorbing, having a high thermal conductivity) and/or it is anticipated that changes to the thermal properties of the screen are likely to affect relative small areas thereof. In other examples, the reference energy level may be predetermined, for example an anticipated, modelled, or previously measured energy level returned from the reflector in use. In some examples, the reference energy level may be a threshold energy level.

Determining a difference from a reference energy level may highlight hot and/or cold spots.

In some examples, rather than considering actual energy levels (e.g. temperatures), the energy levels may be considered in terms of bins, for example such that a plurality of pixels of the image into temperature bins having an associated temperature range.

In another example, rather than considering the difference from a reference energy level, determining an energy profile could comprise determining an energy gradient based on the difference in energy measured between neighbouring or close pixels, and determining if this exceeds a threshold, or determining any pixels are associated with an absolute energy level (e.g. temperature) outside a predetermined range or the like.

In some examples, a hot or cold spot may be determined by acquiring a number of images as the reflector (in this example, the build material distributor) moves through the measurement field. In such an example, if, for example, a hot spot is due to an accumulation of fused plastic particles on the screen, such a hot spot may stay stationary in images taken as the distributor moves. Thus, the hot spot may appear in relation to the same imaging pixels, while the imaging pixels corresponding to the reflector change. In such examples, therefore, determining an energy profile may comprise determining the difference between energy levels associated with a particular pixel as the distributor (or more generally thermal reflector) moves through the field.

In some examples, a combination of any of these techniques and/or other techniques may be used.

Block 206 comprises identifying the presence of a temperature anomaly, i.e. an energy level outside this predetermined range (i.e. above the reference energy level by at least a predetermined threshold) in at least one location (i.e., in this example, pixel) of the thermal image. In other examples, cold spots may be identified. The range may for example be determined bearing in mind safety and/or the intended accuracy of thermal measurement.

Block 208 comprises determining, from detected any temperature anomaly, the presence of a deposit on the screen. For example, a hot spot on the image of the build material distributor may be attributed not to the build material distributor, but to a hot spot on the screen due to the presence of a heat absorbing material such as plastic powder or fused build material. Other deposits may block radiation and appear as 'cold spots'. If it is determined that at least one temperature anomaly exists, the method continues with block 210, in which an output indicative of a maintenance operation (e.g. cleaning or replacement) for the screen is generated. This may for example comprise an audio or visual alert, for example conveyed using electronic apparatus, which may be part of an additive manufacturing apparatus or separate therefrom.

In block 212, the build material distributor is moved to a new position (n becomes n+1), and the process repeats. The positions may for example differ by a spacing equal to one pixel, less than one pixel, more than one pixel or the width of the build material distributor. In some examples, images may be acquired more frequently than they are analysed. For example, images may be acquired substantially at a video frame rate, but only, say, one in 10, 1 in 50, 1 in 100 or the like of the images may be analysed.

In some examples, the method may repeat while the build material distributor traverses a print bed at least substantially in its entirety, thus providing a 'scan' of the screen across the field of interest.

Figure 3:
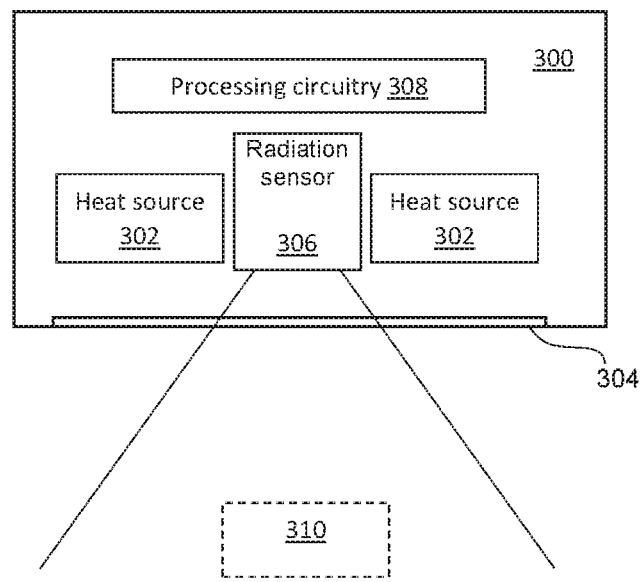
FIG. 3 is a simplified schematic drawing of an example heating apparatus.

FIG. 3 is an example of a heating apparatus 300 comprising a heat source 302, a screen 304, a radiation sensor 306 and processing circuitry 308.

The heat source 302 is to transmit energy via the screen 304. In this example, the heat source 302 is annular (and therefore shown in two portions in cross section and may comprises a plurality of discrete heating elements). The radiation sensor 306 is arranged at the centre of the annulus and is arranged sense energy returned via the screen 304. The measurement field of the radiation sensor 306 is indicated in dotted lines. The screen 304 may comprise any thermally transmissive material, for example quartz, glass or the like.

The processing circuitry 308 determines, from the energy sensed by the radiation sensor 306, a measured energy profile of a reference object 310 (shown in dashed outline as this does not comprise part of the heating apparatus in this example). The processing circuitry 308 also identifies any departure from an anticipated energy profile of the reference object 310 and thereby determines a thermal transmission characteristic (and correspondingly, or by inference, a thermal absorption characteristic) of the screen.

The reference object 310 may for example comprise an object having substantially consistent and/or a diffusely reflecting surface. In this example, the reference object 310 is smaller than the size of the measurement field and therefore in order to examine the full extent of screen 304 through which temperatures are sensed, the object may be moved. In some examples, as outlined above, moving the object 310 may allow identification of thermal anomalies due to deposits on the screen as non-moving 'spots' as the object 310 is moved. However, in other examples, larger reference objects 310 may be provided.

The heating apparatus 300 may comprise an additive manufacturing heating apparatus to heat a build material in an additive manufacturing process, i.e. the heating apparatus may be a heating apparatus for an additive manufacturing apparatus. In some examples the reference object 310 comprises a build material distributor, or some other component of an additive manufacturing apparatus, as described above.

In some examples, the radiation sensor 306 may be a non-contact radiation measuring device, for example being arranged to detect radiation which is at or around the waveband associated with thermal imaging (i.e. at or around the infrared wavelength band). In some examples, the radiation sensor 306 is to determine a plurality of temperatures corresponding to a plurality of regions in a measurement field, i.e. to capture a plurality of thermal imaging pixels. The radiation sensor 306 may measure any radiation wavelengths associated with energy returned from an energy source, including optical (i.e. visible to the human eye) and invisible, e.g. thermal or infrared radiation wavelengths. In examples where the apparatus 300 may be for use in an additive manufacturing apparatus, the radiation sensor 306 may be controlled to acquire reading indicative of the temperature of each of a plurality of locations over a layer of build material formed on a print bed of an additive manufacturing apparatus The radiation sensor 306, which may for example be a thermal camera, a thermal imaging array or the like, in this example measures the temperature of each of a plurality of locations (e.g. thermal imaging pixels) over the layer of build material. In some examples, the radiation sensor 306 may comprise a plurality of infrared sensors. In one example, a thermal imaging camera may comprise an array of thermopiles and an optical system. The optical system may comprise a system of lenses such that an infra-red image is formed by the camera. In such an example, each thermopile may return a value representative of radiation integrated within its spectral window (i.e. measured bandwidth).

In some examples, a plurality of independently controllable heat sources 302 may be provided.

For the sake of example, the heat source(s) 302 may provide radiation having an intensity peak at around 1 μm, but having a spread in wavelengths so that appreciable (if much lower) levels of radiation are provided up to around 15 to 20 μm. The radiation sensor 306 may have a detection bandwidth of 10-14 μm. Thus, a proportion of the radiation emitted which is reflected may also be detected. Variations in the energy output by the heat source(s) 302 will have a relatively small effect on this as it is just the 'tail end' of the intensity spectrum which is detected. Put more generally, the sensor 306 may be arranged to detect temperatures/energy levels which fall in a range which is lower than the peak temperature/energy band output by a heat source 302. In practice, the energy in this band may be filtered by some materials which may be used as screens (for example quartz), and in such examples a power correction scaling factor may be used to compensate for this.

Figure 4:
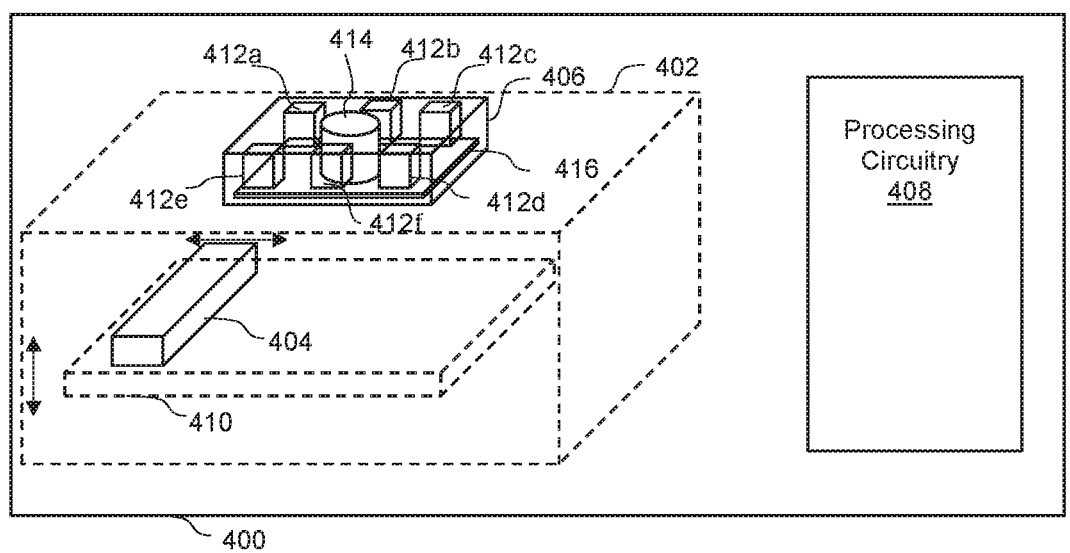
FIG. 4 is a simplified schematic drawing of an example additive manufacturing apparatus.

FIG. 4 is an example of an additive manufacturing apparatus 400 comprising a build material distributor 404, thermal management apparatus 406 and processing circuitry 408.

The build material distributor 404 provides a layer of build material on a print bed 410 in a fabrication chamber 402 (shown in dotted line as these may not comprise an integral part of the apparatus 400), and comprises a thermally reflective surface. For example, the build material distributor 404 may comprise a build material feed mechanism and/or a build material flattening mechanism, such as a roller. The build material distributor 404 may be controlled to move across the print bed 410 using any suitable drive mechanism, as indicated by the arrows. The print bed 410 may move vertically in the fabrication chamber 402, for example such that the surface layer of build material may be positioned a substantially constant distance from the thermal management apparatus 406 as an object being manufactured grows in a layer wise manner.

The thermal management apparatus 406 comprises at least one heat source 412 (in this example, an array of heat sources 412a-f), a thermal imager 414, and a screen 416 through which heat is transmitted into the fabrication chamber and through which a thermal image of at least a portion of the fabrication chamber 402 is acquired.

The processing circuitry 408 is to identify the reflective surface of the build material distributor 404 in an acquired thermal image and to determine, based on an energy profile of the reflective surface, a thermal transmission characteristic of the screen. For example, this may identify a 'hot spot' indicating that the screen is absorbing more energy in a region, in turn implying that it has become contaminated.

In this example, the build material distributor 404 is, in use of the apparatus 400, to traverse at least part of the fabrication chamber 402 and the thermal management apparatus 406 acquires a plurality of thermal images, wherein the position of the build material distributor 404 is different in different thermal images. This may allow at least a portion and in some examples substantially the whole of the screen 416 to be checked for variations in thermal transmission. In some examples, this may allow thermal anomalies to be detected as non-moving spots which will appear relative to different locations on the build material distributor 404 as the distributor 404 moves.

Figure 5:
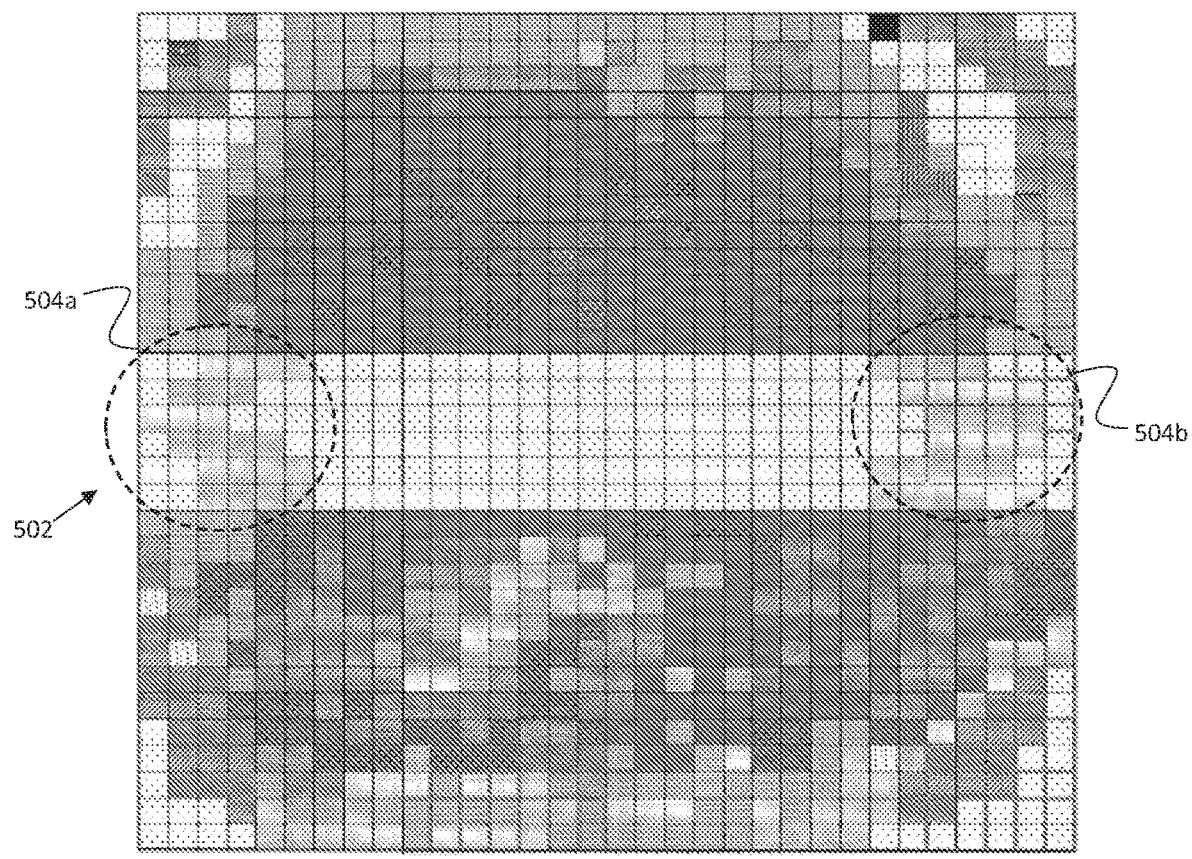
FIG. 5 is an example of a thermal image of part of an additive manufacturing apparatus.

FIG. 5 is an example of a thermal image which may be acquired by the thermal management apparatus 406. The portion of the image corresponding to the build material distributor 404 is indicated generally at 502 and has a substantially rectangular surface, in this example extending across the full width of the image and a height in the image corresponding to approximately six imaging pixels (the image as whole comprising, in this example 32 pixels by 32 pixels). The remainder of the image shows the temperature of build material arranged on a print bed 410. The pixels are shown such that darker pixels are indicative of higher energy levels (i.e. higher temperatures). Thus, the distributor 404 generally returns less energy than the build material in this example. It may be noted that providing thermally reflective backing to the build material distributor 404 may allow a lower operating temperature for the distributor 404.

It can be seen that, towards the end of the region of the image corresponding to the distributor 404, there are higher energy portions 504. In this example, the distributor 404 is expected to return energy in a substantially constant manner across its surface and therefore these higher energy portions 504 are indicative of hot spots over the imaging portion of a screen 416. In some examples, the energy differences over the distributor 404 may be considered to determine if a threshold temperature to categorise a measurement as indicating a thermal anomaly has been crossed and, if so, a cleaning operation or screen replacement may be indicated.

The resolution with which a hot or cold spot may be identified increases with the number of imaging pixels, and this may be balanced by the skilled person with an increase in the cost of apparatus and time to process images as the resolution increases.

In some examples, any radiation sensor 306 or thermal imager 414 described herein may also be used in controlling other aspects of the apparatus, for example to provide feedback to a heat source for pre-heating build material; to provide feedback to a heat source for applying energy to cause coalescence such that an object generation temperature is reached and not unduly exceeded; and/or to determine when a generated object is cooled. A radiation sensor 306/thermal imager 414 may be further used to measure the temperature of other parts of an additive manufacturing apparatus, for example a temperature of a spittoon, a web wipe or of a drop detector.

Examples in the disclosure may be combined. For example, components described in relation to the heating apparatus 300 may be used in the thermal management apparatus 406. The radiation sensor 306 may have any feature or attribute described in relation to the thermal imager 414 and vice versa. The processing circuitry 308 may provide a component of the processing circuitry 408, and vice versa. The processing circuitry 308, 408 may be arranged to carry out the methods of FIGS. 1 and/or 2.

Some examples in the present disclosure can be provided at least in part as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that at least one flow in the flow charts, as well as at least one combination of the flows in the flow charts can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus (such as the processing circuitry 308, 408) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
   acquiring, by a sensor, a thermal image of a reflector within an additive manufacturing apparatus through a screen, the thermal image generated using thermal energy produced by an annular heat source, the sensor positioned in a center of the annular heat source;
   determining, using at least one processor, an energy profile of the thermal image of the reflector; and
   determining, using the at least one processor and based on the energy profile, an operational characteristic of the screen.

2. A method according to claim 1 comprising acquiring a plurality of thermal images of the reflector as the reflector is moved through a field of view of a thermal imaging apparatus.

3. A method according to claim 1 in which determining an energy profile of the thermal image comprises determining at least of:
   i. an absolute acquired energy measurement;
   ii. a difference between acquired energy measurements corresponding to different locations in the thermal image;
   iii. an energy gradient within the thermal image; and
   iv. a presence of an energy level outside a predetermined threshold in at least one location of the thermal image.

4. A method according to claim 1 in which determining an energy profile of the thermal image comprises acquiring a plurality of thermal images of the reflector as the reflector is moved through a field of view of an thermal imaging apparatus and comparing the thermal images to identify thermal anomalies which are in the same location in at least two images.

5. A method according to claim 1 in which determining an operational characteristic comprises determining a presence of a deposit on the screen.

6. A method according to claim 5 in which determining an energy profile comprises determining, in at least a region of the thermal image, a thermal anomaly and determining an operational characteristic comprises determining a presence of a deposit on the screen in the region of the thermal anomaly.

7. A method according to claim 1 further comprising generating, using at least one processor and based on the operational characteristic, an output indicative of a maintenance operation for the screen.

8. A heating apparatus comprising:
an annular heat source;
a thermally transmissive screen;
a radiation sensor positioned in a center of the annular heat source and configured to sense energy having passed through the screen; and
processing circuitry, wherein:
the annular heat source is configured to transmit energy via the thermally transmissive screen and the radiation sensor is to sense energy returned via the thermally transmissive screen; and
the processing circuitry is programmed to determine, from the energy sensed by the radiation sensor, a measured energy profile of a reference object, identify any departure from an anticipated energy profile of the reference object, and thereby to determine a thermal transmission characteristic of the thermally transmissive screen.

9. A heating apparatus according to claim 8 which comprises an additive manufacturing heating apparatus to heat a build material in an additive manufacturing process.

10. A heating apparatus according to claim 8, in which the radiation sensor is to determine a plurality of temperatures corresponding to a plurality of regions in a measurement field.

11. A heating apparatus according to claim 8 comprising a plurality of independently controllable heat sources.

12. A heating apparatus according to claim 8 in which the reference object comprises a diffusely reflecting thermal reflector.

13. Additive manufacturing apparatus comprising:
a build material distributor to provide a layer of build material on a print bed of a fabrication chamber, the build material distributor comprising a diffusely reflective surface;
thermal management apparatus; and
processing circuitry;
wherein the thermal management apparatus comprises a heat source, a thermal imager, and a screen through which heat is transmitted into the fabrication chamber and is configured to acquire a thermal image of at least a portion of the fabrication chamber; and
the processing circuitry is configured to identify the surface of the build material distributor in an acquired thermal image and to determine, based on an energy profile of the surface, a thermal transmission characteristic of the screen.

14. Additive manufacturing apparatus according to claim 13 in which the diffusely reflective surface comprises a thermally reflective surface.

15. Additive manufacturing apparatus according to claim 13 in which the build material distributor is, in use of the additive manufacturing apparatus, to traverse at least part of the fabrication chamber and wherein the thermal management apparatus is to acquire a plurality of thermal images, wherein a position of the build material distributor is different in different thermal images.

* * * * *